(12) United States Patent
Peterson

(10) Patent No.: US 9,206,847 B2
(45) Date of Patent: Dec. 8, 2015

(54) ROLLER BEARING ASSEMBLIES, APPARATUSES, AND RELATED METHODS OF MANUFACTURE

(75) Inventor: S. Barrett Peterson, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 990 days.

(21) Appl. No.: 13/356,789

(22) Filed: Jan. 24, 2012

(65) Prior Publication Data

US 2013/0188899 A1 Jul. 25, 2013

(51) Int. Cl.
| | |
|---|---|
| *F16C 33/62* | (2006.01) |
| *F16C 33/60* | (2006.01) |
| *F16C 19/26* | (2006.01) |
| *F16C 33/30* | (2006.01) |

(52) U.S. Cl.
CPC ............... *F16C 33/60* (2013.01); *F16C 19/26* (2013.01); *F16C 33/303* (2013.01); *F16C 33/62* (2013.01)

(58) Field of Classification Search
CPC ......... F16C 33/58; F16C 33/583; F16C 33/62
USPC .................... 384/492, 565, 569, 615, 622
See application file for complete search history.

(56) References Cited

U.S. PATENT DOCUMENTS

| | | | |
|---|---|---|---|
| 5,322,735 A * | 6/1994 | Fridez et al. ............... 428/357 |
| 5,593,234 A | 1/1997 | Liston | |
| 6,340,245 B1 | 1/2002 | Horton et al. | |
| 6,655,845 B1 | 12/2003 | Pope et al. | |
| 7,635,035 B1 | 12/2009 | Bertagnolli et al. | |
| 7,665,898 B2 | 2/2010 | Pope et al. | |
| 7,842,111 B1 | 11/2010 | Sani | |
| 7,866,418 B2 | 1/2011 | Bertagnolli et al. | |
| 2002/0191878 A1 * | 12/2002 | Ueda et al. ............... 384/492 |
| 2011/0174544 A1 | 7/2011 | Scott et al. | |

FOREIGN PATENT DOCUMENTS

WO WO 2004/001238 12/2003

OTHER PUBLICATIONS

U.S. Appl. No. 11/545,929, filed Oct. 10, 2006, Bertagnolli et al.
U.S. Appl. No. 13/166,007, filed Jun. 22, 2011, Chapman et al.
International Search Report and Written Opinion from International Application No. PCT/US2013/021678 mailed Apr. 5, 2013.

* cited by examiner

*Primary Examiner* — Phillip A Johnson
(74) *Attorney, Agent, or Firm* — Dorsey & Whitney LLP

(57) ABSTRACT

In an embodiment, a roller bearing assembly may include superhard bearing elements distributed circumferentially about an axis, with gaps located between adjacent ones of the superhard bearing elements. Each of the superhard bearing elements may include a bearing surface and a pair of side surfaces intersecting the bearing surface. Each of the side surfaces may form a respective oblique angle relative to the axis. The roller bearing assembly may include a support ring having the superhard bearing elements affixed thereto. The bearing surfaces of the superhard bearing elements may be positioned and configured to form at least a portion of a superhard raceway for rolling elements to roll over. The oblique angle may be selected to at least partially inhibit the gaps from impeding the rolling elements during operation.

20 Claims, 16 Drawing Sheets

ROLLER BEARING ASSEMBLIES, APPARATUSES, AND RELATED METHODS OF MANUFACTURE

BACKGROUND

Roller bearing apparatuses are found in a variety of applications from construction and mining equipment to axle systems. Typically, roller bearing apparatuses include two races, a plurality of rolling elements between the races, and a cage that separates and guides the rolling elements. Usually one of the races is held fixed. As one of the races rotates, it causes the rolling elements to rotate as well which, in turn, reduces rotational friction between the races. In addition to reducing rotational friction, roller bearing apparatuses typically support bearing loads by transmitting loads between the rolling elements and the races.

However useful, roller bearing apparatuses tend to wear out with use and/or fail without warning. In general, performance (e.g., load capacities, bearing speed, and operating periods) and/or the useful life of roller bearing apparatuses can be limited by overheating, fatigue failure, flaking, micro pitting, and other damage due to friction and/or repeated loading of the rolling elements on the races.

Therefore, manufacturers and users of roller bearing apparatuses continue to seek improved roller bearing assembly and apparatus designs and manufacturing techniques.

SUMMARY

Various embodiments of the invention relate to roller bearing assemblies and apparatuses that may include features configured to enhance the useful life of the roller bearing assembly and apparatuses. The various embodiments of the bearing assemblies and apparatuses may be used in pumps, turbines, transmissions, subterranean drilling systems, and other types of systems.

In an embodiment, a roller bearing assembly may include a plurality of superhard bearing elements distributed circumferentially about an axis, with gaps located between adjacent ones of the superhard bearing elements. Each of the superhard bearing elements may include a bearing surface and at least one side surface intersecting the bearing surface. The at least one side surface may form a respective oblique angle relative to the axis. The roller bearing assembly may include a support ring having the superhard bearing elements affixed thereto. The bearing surfaces of the superhard bearing elements may be positioned and configured to form at least a portion of a superhard raceway for rolling elements to roll over. The respective oblique angle may be selected to at least partially inhibit the gaps from impeding the rolling elements during operation.

In an embodiment, a roller bearing apparatus may include a first roller bearing assembly including a first plurality of superhard bearing elements distributed circumferentially about an axis, with each of the first plurality of superhard bearing elements including a bearing surface and at least one side surface intersecting the bearing surface. The first roller bearing assembly may also include a first support ring that carries the first plurality of superhard bearing elements. The bearing surfaces of the first plurality of superhard bearing elements may be positioned and configured to form a first portion of a superhard raceway. A second roller bearing assembly may include a second plurality of superhard bearing elements generally opposed to the first plurality of superhard bearing elements of the first roller bearing assembly. The second roller bearing assembly may also include a second support ring that carries the second plurality of superhard bearing elements. The second plurality of superhard bearing elements may be positioned and configured to form a second portion of the superhard raceway. The roller bearing apparatus may also include a plurality of superhard rolling elements interposed between the first roller bearing assembly and the second roller bearing assembly. The plurality of superhard rolling elements may be positioned and configured to roll over the superhard raceway.

In an embodiment, a roller bearing assembly may include a plurality of superhard bearing elements distributed circumferentially about an axis. Each of the superhard bearing elements may include a bearing surface positioned and configured to form at least a portion of a superhard raceway for rolling elements to roll over and a concave boundary at least partially defining a recess that receives an adjacent one of the superhard bearing elements. The roller bearing assembly may include a support ring having the superhard bearing elements affixed thereto. In some embodiments, the respective bearing surfaces of the superhard bearing elements may be substantially planar. In other embodiments, the support ring may include a plurality of bearing recesses in which a corresponding one of the superhard bearing elements are mounted, with each of the plurality of bearing recesses including an inclined bottom portion configured to position the bearing surfaces of adjacent ones of the plurality of superhard bearing elements along a generally cylindrical reference surface. In other embodiments, such a roller bearing assembly may be incorporated into a roller bearing apparatus.

Further embodiments are directed to methods of manufacturing any of the disclosed roller bearing assemblies and apparatuses.

Other embodiments include applications utilizing the disclosed roller bearing assemblies and apparatuses in various types of pumps, transmission, turbines, drilling systems and other applications.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Figure 1A:
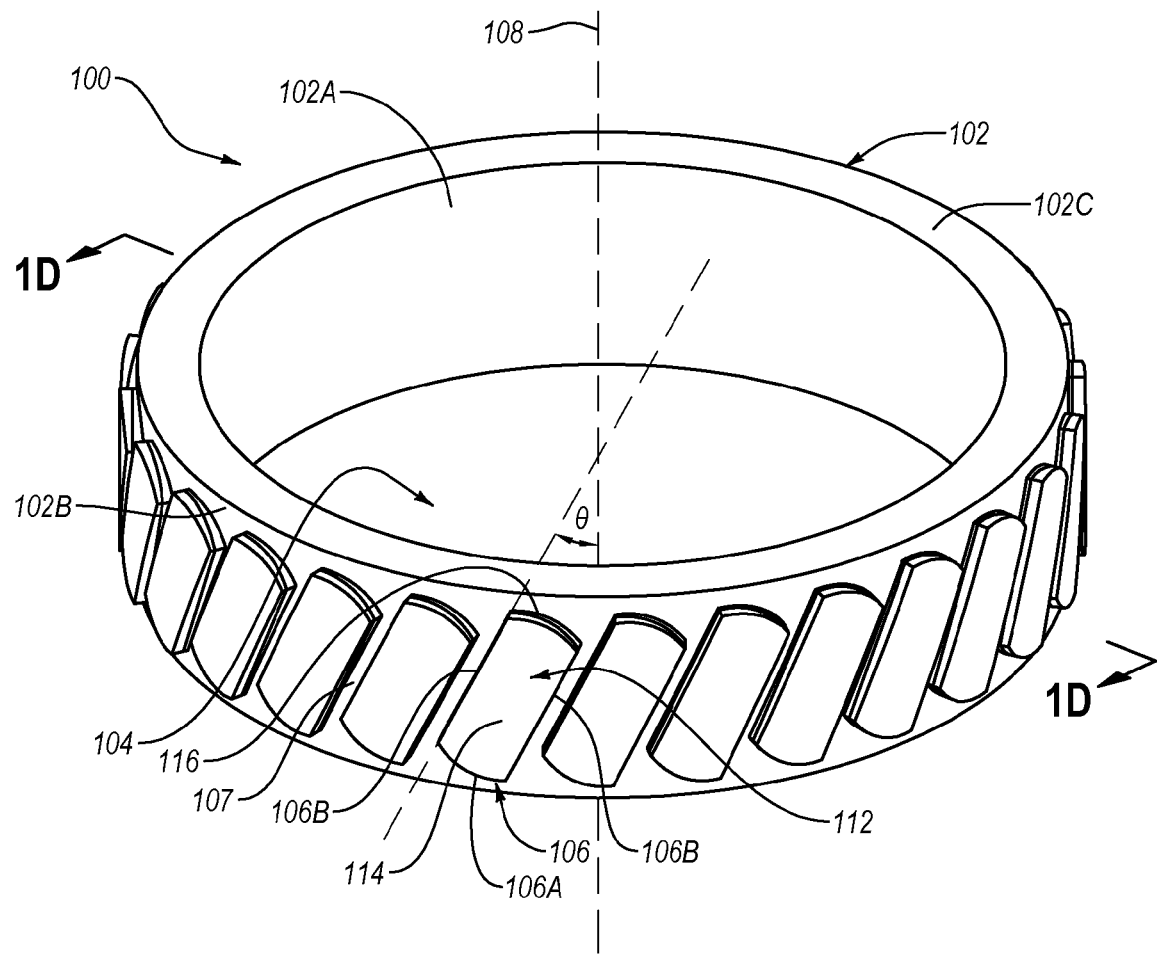
FIG. 1A is an isometric view of a radial roller bearing assembly according to an embodiment.

Embodiments of the invention relate to roller bearing assemblies, bearing apparatuses, and motor assemblies that include such roller bearing assemblies. FIG. 1A is an isometric view of a radial roller bearing assembly 100 according to an embodiment. The radial roller bearing assembly 100 may form a stator or a rotor of a radial roller bearing apparatus used in a pump, a turbine, transmission, or other type of system. The radial roller bearing assembly 100 may include a support ring 102 defining an opening 104 through which a shaft or spindle (not shown) of, for example, a drilling motor may extend. The support ring 102 may be made from a variety of different materials. For example, the support ring 102 may comprise carbon steel, stainless steel, tungsten carbide, or another suitable material. In an embodiment, the support ring 102 may have an inner surface 102A substantially parallel to an outer surface 102B. In other embodiments, the inner surface 102A may be substantially non-parallel to the outer surface 102B.

In an embodiment, the radial roller bearing assembly 100 may include features configured to enhance the useful life of the radial roller bearing assembly 100. For example, the radial roller bearing assembly 100 may include a plurality of superhard bearing elements 106 configured and positioned to at least partially define a superhard raceway for superhard rolling elements (similar to those shown in FIGS. 3A and 3B). A raceway is a substantially continuous or discontinuous surface over which the rolling elements roll over or run on. By forming a superhard raceway with the superhard bearing elements 106, deformation of the support ring 102 and/or the risk of fatigue may be reduced because the rolling elements generally do not contact the support ring 102. Moreover, fatigue at the bearing contact surface between the superhard bearing elements 106 and the superhard rolling elements may also be reduced because superhard bearing material does not deform as much as a traditional bearing surface (i.e., steel) due to the superhard bearing material's high modulus of elasticity. In addition, the configuration of the superhard bearing elements 106 may increase the general load capacity of the radial roller bearing assembly 100.

In an embodiment, each of the plurality of superhard bearing elements 106 may be distributed about a rotation axis 108 and mounted in a corresponding recess 110 (shown in FIGS. 1C and 1D) formed in the outer surface 102B of the support ring 102. The superhard bearing elements 106 may be partially secured in the recesses 110 via brazing, welding, soldering, press-fitting, threadly attaching, fastening with a fastener, combinations of the foregoing, or another suitable technique. In an embodiment, the superhard bearing elements 106 may be arranged in a single row. In other embodiments, the superhard bearing elements 106 may be circumferentially distributed about the rotation axis 108 in two rows, three rows, or any number of rows. A gap 107 may be located between adjacent ones of the superhard bearing elements 106. The gaps 107 may be sized and configured such that the rolling elements maintain contact with one or more of the superhard bearing elements 106 as the rolling elements roll over the superhard bearing elements 106. For example, in an embodiment, a width of one or more of the gaps 107 or an average width of the gaps 107 may be about 0.00020 inches to 0.100 inches, and more particularly about 0.00020 inches to 0.020 inches. In other embodiments, one or more of the gaps 107 may exhibit larger or smaller widths.

Referring still to FIG. 1A, the superhard bearing elements 106 may be configured and positioned on the support ring 102 to help prevent rolling elements from lodging in the gaps 107. For example, each of the superhard bearing elements 106 may include a pair of side surfaces 106B. Optionally, each side surface 106B may extend along a substantially straight path that forms a respective oblique angle θ relative to the rotation axis 108. In some embodiments, the side surfaces 106B may be generally parallel to each other. In some embodiments, each of the superhard bearing elements 106 may be substantially at the same oblique angle θ relative to the rotation axis 108, while in other embodiments, the oblique angles θ may be different. In an embodiment, the angle θ may be about 40 degrees to 85 degrees; about 50 degrees to 80 degrees; or about 55 degrees to 75 degrees. In other embodiments, the angle θ may be larger or smaller. The angle θ may be selected such that only a portion of a rolling element (not shown in FIG. 1A) is adjacent to a gap 107 between two of the superhard bearing elements 106 at any given time, while the remainder of the rolling element maintains contact with one or more of the two superhard bearing elements 106. Thus, the rolling elements may avoid becoming impeded by the gaps 107 during operation.

Figure 1B:
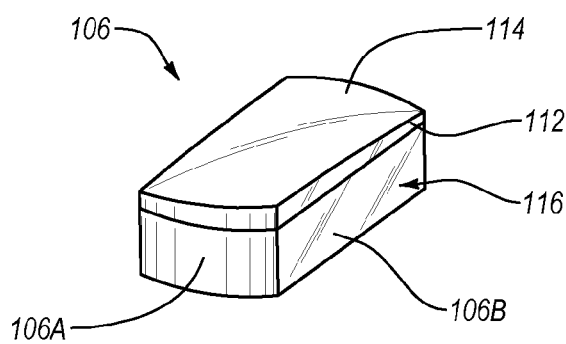
FIG. 1B is an isometric view of one of the superhard bearing elements shown in FIG. 1A according to an embodiment.

FIG. 1B is an isometric view of one of the superhard bearing elements 106 removed from the support ring 102. The superhard bearing elements 106 may have any suitable geometry (e.g., a stadium-like geometry with the generally parallel side surfaces 106B and generally semi-cylindrical convex end portions 106A). In other embodiments, the superhard bearing elements 106 may have a geometric shape that is generally oval, generally rectangular, generally wedge-like, generally moon-like, or any other suitable geometric shape configured to help prevent lodging of rolling elements. At least some of the superhard bearing elements 106 may comprise a superhard table 112 including a convexly-curved bearing surface 114 (i.e., curved to lie on an imaginary cylindrical surface) as shown in FIGS. 1B and 1D. In other embodiments, the bearing surfaces 114 may be concavely-curved or have other suitable shapes. Each of the superhard table 112 may be bonded to a corresponding substrate 116. Optionally, one or more of the superhard bearing elements 106 may exhibit a peripherally-extending edge chamfer. However, in other embodiments, the edge chamfer may be omitted. As used herein a "superhard bearing element" is a bearing element including a bearing surface that is made from a material exhibiting a hardness that is at least as hard as tungsten carbide.

In an embodiment, the superhard bearing elements 106 may be made from one or more superhard materials, such as polycrystalline diamond, polycrystalline cubic boron nitride, silicon carbide, tungsten carbide, or any combination of the foregoing superhard materials. In an embodiment, the superhard table 112 may be formed from polycrystalline diamond and the substrate may be formed from cobalt-cemented tungsten carbide. Furthermore, in any of the embodiments disclosed herein, the polycrystalline diamond table may be leached to at least partially or substantially completely remove a metal-solvent catalyst (e.g., cobalt, iron, nickel, or alloys thereof) that was used to initially sinter precursor diamond particles that form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be unleached and include a metal-solvent catalyst (e.g., cobalt, iron, nickel, or alloys thereof) that was used to initially sinter the precursor diamond particles that form the polycrystalline diamond or an infiltrant used to re-infiltrate a preformed leached polycrystalline diamond table. Other examples of methods for fabricating the superhard bearing elements are disclosed in U.S. Pat. Nos. 7,866,418, 7,842,111; and co-pending U.S. patent application Ser. No. 11/545,929, the disclosure of each of which is incorporated herein, in its entirety, by this reference.

The diamond particles that may form the polycrystalline diamond in the superhard table 112 may also exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). F13/116 In an embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation. Upon sintering the diamond particles to form the polycrystalline diamond, the polycrystalline diamond may, in some cases, exhibit an average grain size that is the same or similar to any of the diamond particles sizes and distributions discussed above.

Additionally, in any of the embodiments disclosed herein, the superhard bearing elements 106 may be free-standing (e.g., substrateless) and formed from a polycrystalline diamond body that is at least partially or fully leached to remove a metal-solvent catalyst initially used to sinter the polycrystalline diamond body.

Figure 1C:
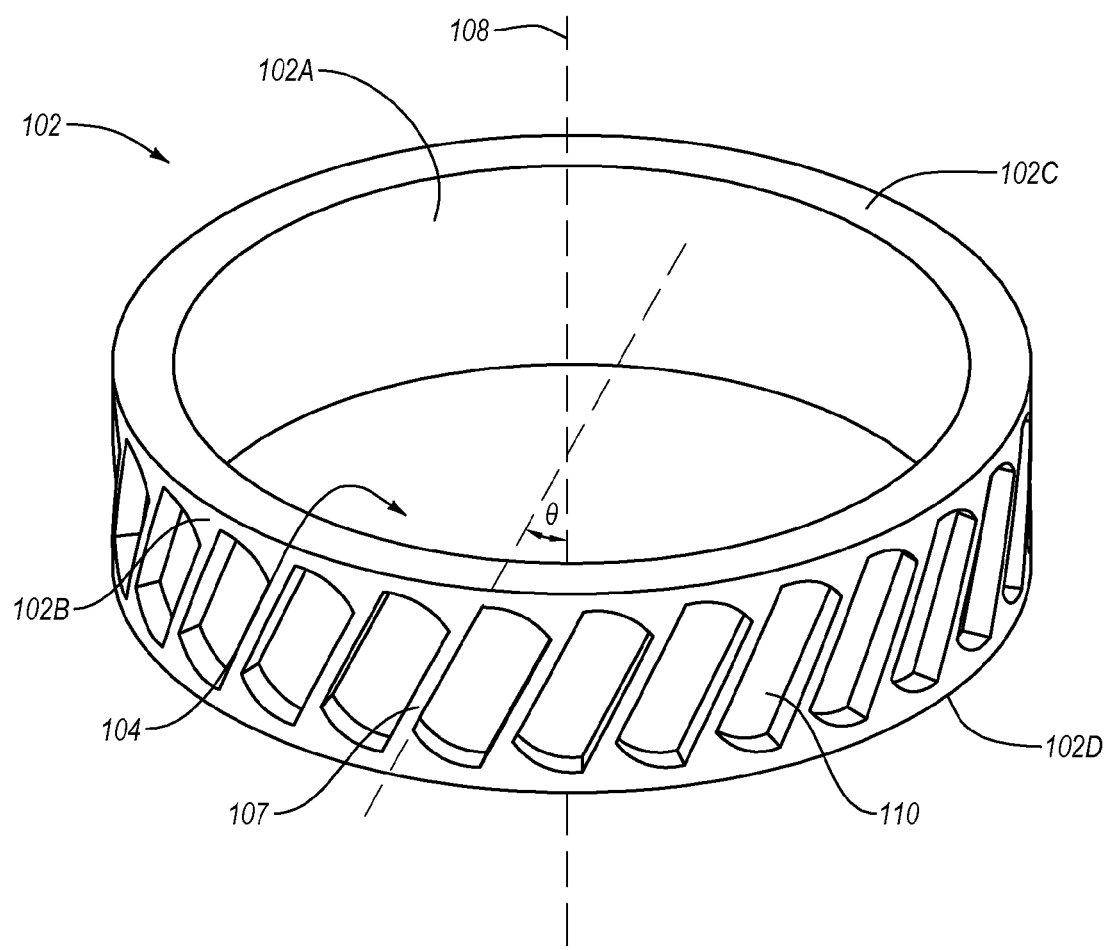
FIG. 1C is an isometric view of the radial roller bearing assembly shown in FIG. 1A, with the superhard bearing elements removed.
Figure 1D:
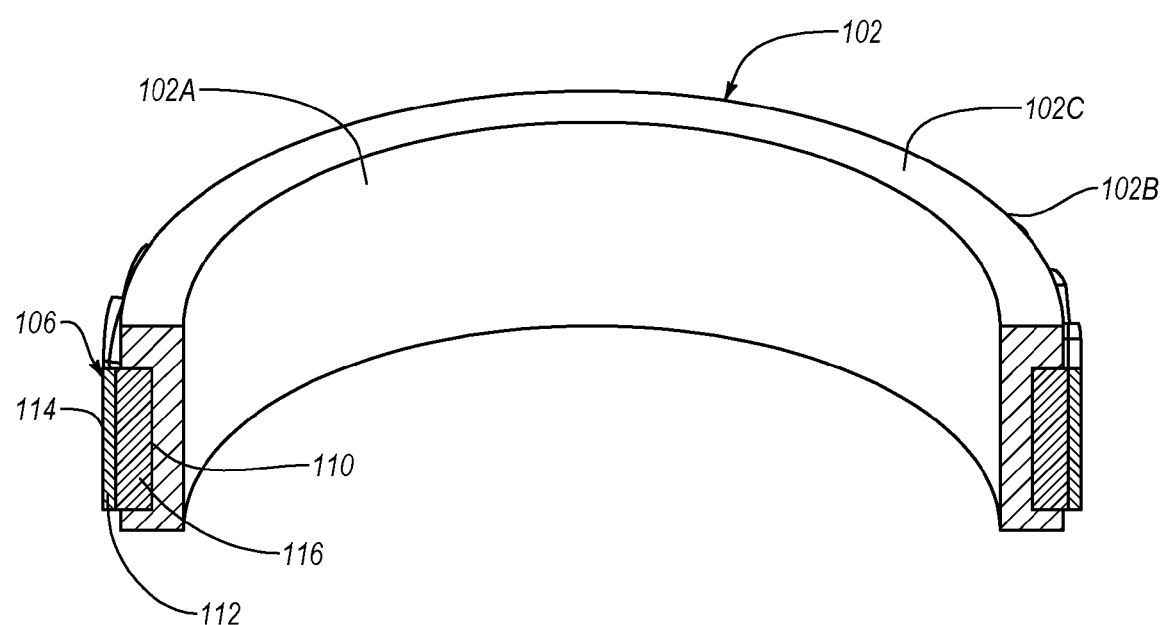
FIG. 1D is a cross-sectional view taken along line 1D-1D of the radial roller bearing assembly shown in FIG. 1A.

FIG. 1C is an isometric view of the support ring 102 with the superhard bearing elements 106 removed. The recesses 110 may be configured to correspond to the generally shape and configuration of the superhard bearing elements 106. For example, like the superhard bearing elements 106, each of the recesses 110 may have an edge extending along a substantially straight path that forms the oblique angle θ relative to the rotation axis 108. In an embodiment, the gaps 107 between the recesses 110 may be partially occupied by a portion of the support ring 102. Such a configuration may increase the contact area between the support ring 102 and each of the superhard bearing elements 106 to help affix the superhard bearing elements 106 to the support ring 106. In other embodiments, the recesses 110 may be configured and positioned such that the gaps 107 are omitted. For example, the recesses 110 may be interconnected to form a slot such that adjacent superhard bearing elements 106 are adjacent to one another and/or abut one another.

Figure 2A:
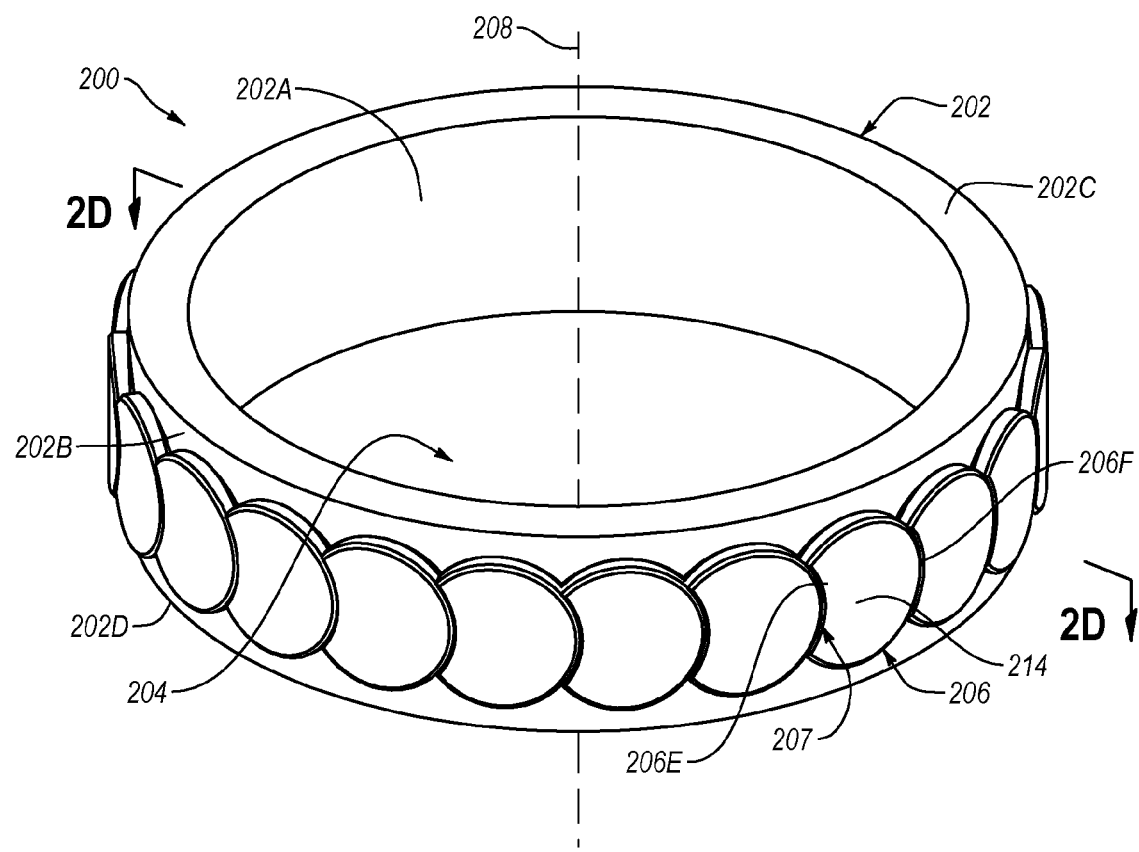
FIG. 2A is an isometric view of a radial roller bearing assembly according to an embodiment.

FIG. 2A is an isometric view of a radial roller bearing assembly 200 according to an embodiment. The radial bearing assembly 200 may be similar in many respects to the radial bearing assembly 100. As shown in FIG. 2A, the radial bearing assembly 200 may include a support ring 202 defining an opening 204 through which a shaft or spindle (not shown) of, for example, a drilling motor may extend. The support ring 202 may be made from any of the materials described above for the support ring 102. In an embodiment, the support ring 202 may include an inner surface 202A substantially parallel an outer surface 202B. In other embodiments, the inner surface 202A may be substantially non-parallel the outer surface 202B. As illustrated, the support ring 202 may also include an upper surface 202C and a lower surface 202D.

In an embodiment, the radial roller bearing assembly 200 may include features configured to enhance the useful life of the radial roller bearing assembly 200. For example, the radial roller bearing assembly 200 may include a plurality of superhard bearing elements 206 configured and positioned to at least partially define a superhard raceway for superhard rolling elements (shown in FIGS. 3A and 3B) to roll over or run on during use of the radial roller bearing assembly 200. By forming a superhard raceway with the superhard bearing elements 206, deformation of the support ring 202 and/or the risk of fatigue may be reduced because the rolling elements generally avoid contact with the support ring 202. Moreover, fatigue at the bearing contact surface between the superhard bearing elements 206 and the superhard rolling elements may also be reduced because superhard bearing material does not deform as much as a traditional bearing surface (i.e., steel) due to the superhard bearing material's high modulus of elasticity. In addition, the superhard bearing elements 206 may enhance the general load capacity of the radial roller bearing assembly 200.

In an embodiment, each of the superhard bearing elements 206 may be distributed about a rotation axis 208 and mounted in a corresponding recess 210 (shown in FIGS. 2C and 2D) formed in the support ring 202 or a common slot for all of the superhard bearing elements 206 formed in the support ring 202. The superhard bearing elements 206 may be partially positioned in and secured to the recesses 210 via brazing, welding, soldering, press-fitting, threadly attaching, fastening with a fastener, combinations of the foregoing, or another suitable technique. The superhard bearing elements 206 may be circumferentially distributed about the rotation axis 208 in one row, two rows, three rows, or any number of rows.

The superhard bearing elements 206 may have a generally cylindrical geometric shape with a concave boundary 207 at least partially defining a recess, which is at least partially defined by a concave lateral surface 206E. In an embodiment, the concave boundaries 207 may have a substantially constant radius of curvature, thereby forming an arc along the first concave surface 206E. In other embodiments, the concave boundaries 207 may take the form of any portion of a circle, oval, ellipse, or any other suitable geometric shape. The concave boundaries 207 may also have any of a variety of sizes.

For example, one or more of the concave boundaries 207 may have an arc length larger or smaller than an average diameter of the superhard bearing elements 206. In an embodiment, the length of the concave boundaries 207 may be about sixty (60) percent to one hundred thirty (130) percent; about seventy (70) percent to one hundred ten (110) percent; or about eighty (80) percent to one hundred (100) percent the average diameter of the superhard bearing elements 206.

In an embodiment, the superhard bearing elements 206 may include a convex lateral surface 206F configured to substantially correspond to the concave boundary 207. Such a configuration may allow the superhard bearing elements 206 to be positioned on the support ring 202 such that each of the concave boundary 207 substantially corresponds with the convex lateral surface 206F of an adjacent one of the superhard bearing elements 206 and receives (e.g., nests) the adjacent one of the superhard bearing elements 206. In an embodiment, gaps may be located between adjacent ones of the superhard bearing elements 206. The gaps may be sized and configured such that the rolling elements maintain contact with one or more of the superhard bearing elements 206 as the rolling elements roll over the superhard bearing elements 206. For example, in an embodiment, a width of one or more of the gaps 107 or an average width of the gaps 107 may be about 0.00020 inches to 0.020 inches, such as about 0.0050 inches to about 0.010 inches. In other embodiments, one or more of the gaps may exhibit larger or smaller widths.

While the superhard bearing elements are illustrated having a generally cylindrical geometric shape, in other embodiments, the superhard bearing elements 206 may have a geometric shape that is generally oval, generally stadium-like, generally kidney-like, generally wedge shaped, or the like.

Figure 2B:
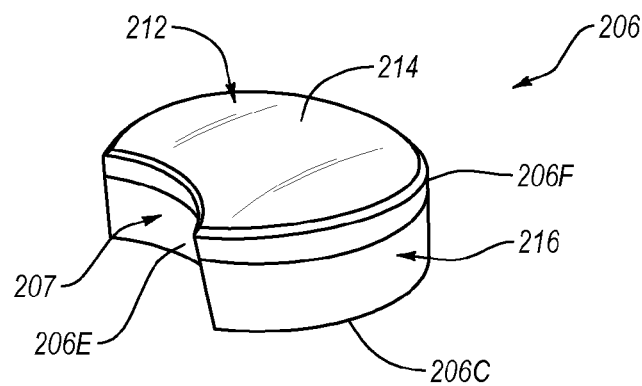
FIG. 2B is an isometric view of one of the superhard bearing elements shown in FIG. 2A according to an embodiment.

FIG. 2B is an isometric view of one of the superhard bearing elements 206 removed from the support ring 202. The superhard bearing element 206 may comprise a superhard table 212 including a convexly-curved bearing surface 214 (e.g., curved to lie on an imaginary cylindrical surface). In other embodiments, the bearing surfaces 214 may be concavely-curved or have other suitable shapes. Each of the superhard table 212 may be bonded or attached to a corresponding substrate 216. Like the superhard bearing elements 106, one or more of the superhard bearing elements 206 may exhibit a peripherally extending edge chamfer. However, in other embodiments, the edge chamfer may be omitted. In addition, the superhard bearing elements 206 may be made from any of the materials described above for the superhard bearing elements 106.

Figure 2C:
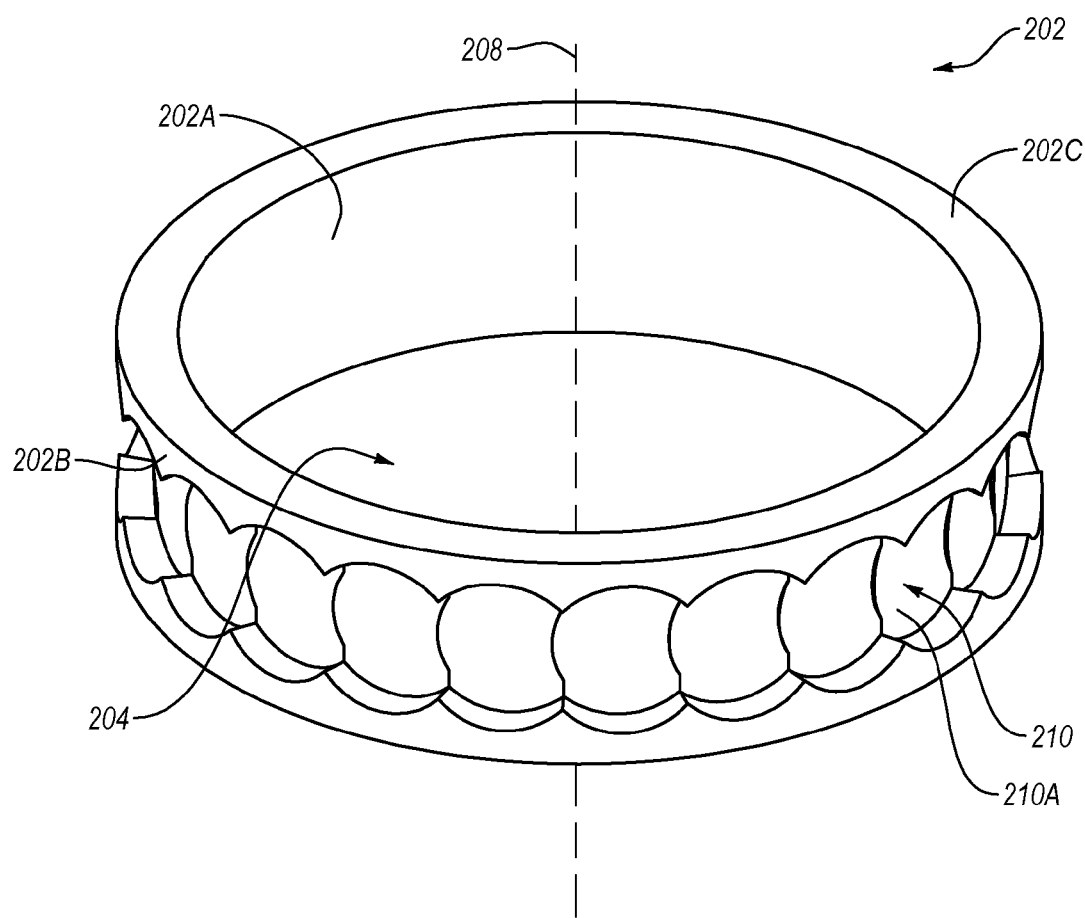
FIG. 2C is an isometric view of the radial roller bearing assembly shown in FIG. 2A, with the superhard bearing elements removed.

FIG. 2C is an isometric view of the radial roller bearing assembly 200, with the superhard bearing elements 206 removed. The recesses 210 may include an inclined bottom portion 210A, and may be configured to generally correspond to the geometry of the superhard bearing elements 206. In an embodiment, the recesses 210 may be configured and spaced in the support ring 202 to partially overlap such that adjacent superhard bearing elements 206 substantially abut one another and form a substantially contiguous raceway. In other embodiments, the recesses 210 on the support ring 202 may be configured and spaced such that adjacent superhard bearing elements 206 do not abut each other.

Figure 2D:
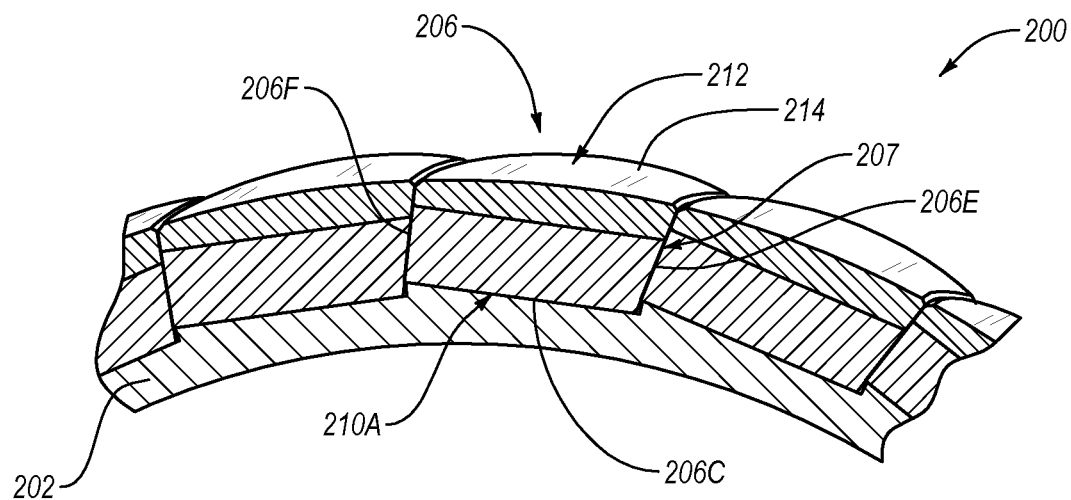
FIG. 2D is a cross-sectional view taken along line 2D-2D of the radial roller bearing assembly shown in FIG. 2A.

FIG. 2D is a partial cross-sectional view of the radial roller bearing assembly 200. In an embodiment, the recesses 210 and the superhard bearing elements 206 may be configured to help secure the superhard bearing elements 206 to the support ring 202. For example, the recesses 210 may be formed such that the inclined bottom portion 210A of each of the recesses 210 forms an oblique angle relative to the inner surface 202A (see FIG. 2A) of the support ring 202 or the rotation axis 208.

In an embodiment, the angle may be about 1 degree to 45 degrees; about 5 degrees to 40 degrees; about 10 degrees to 35 degrees, or about 15 degrees to 30 degrees relative to the inner surface 202A. In other embodiments, the inclined bottom portion 210A of the recesses 210 (shown in FIG. 2C) may form either a larger or smaller angle relative to the inner surface 202A. The recesses 210 may be machined by CNC milling, electro-discharge machining ('EDM"), laser-cutting, grinding, traditional milling, combinations thereof, or the like.

Similarly, at least some of the superhard bearing elements 206 may be formed such that the first concave surface 206E is obliquely angled relative to a bottom surface 206C of the superhard bearing elements 206. The angle between the first concave surface 206E and the bottom surface 206C may be about 95 degrees to 135 degrees, about 100 degrees to 130 degrees, about 105 degrees to 125 degrees, or about 110 degrees to 120 degrees. In other embodiments, the angle may be larger or smaller. The angled surface may be formed by EDM, laser-cutting, grinding, combinations thereof, or otherwise machining the superhard bearing elements 206. For example, suitable laser-cutting techniques are disclosed in U.S. application Ser. No. 13/166,007 filed on Jun. 22, 2011, the disclosure of which is incorporated herein, in its entirety, by this reference.

By angling the first concave surfaces 206E of the superhard bearing elements 206 relative to the bottom surfaces 206C, the superhard bearing elements 206 may be positioned on the inclined bottom portions 210A of the recesses 210 such that the bearing surfaces 214 of the superhard bearing elements 206 are arranged along an imaginary generally cylindrical surface. In addition, the first concave surfaces 206E of the superhard bearing elements 206 may interlock with the convex lateral surfaces 206F of adjacent ones of the superhard bearing elements 206 to help secure the superhard bearing elements 206 within the support ring 202.

Figure 3A:
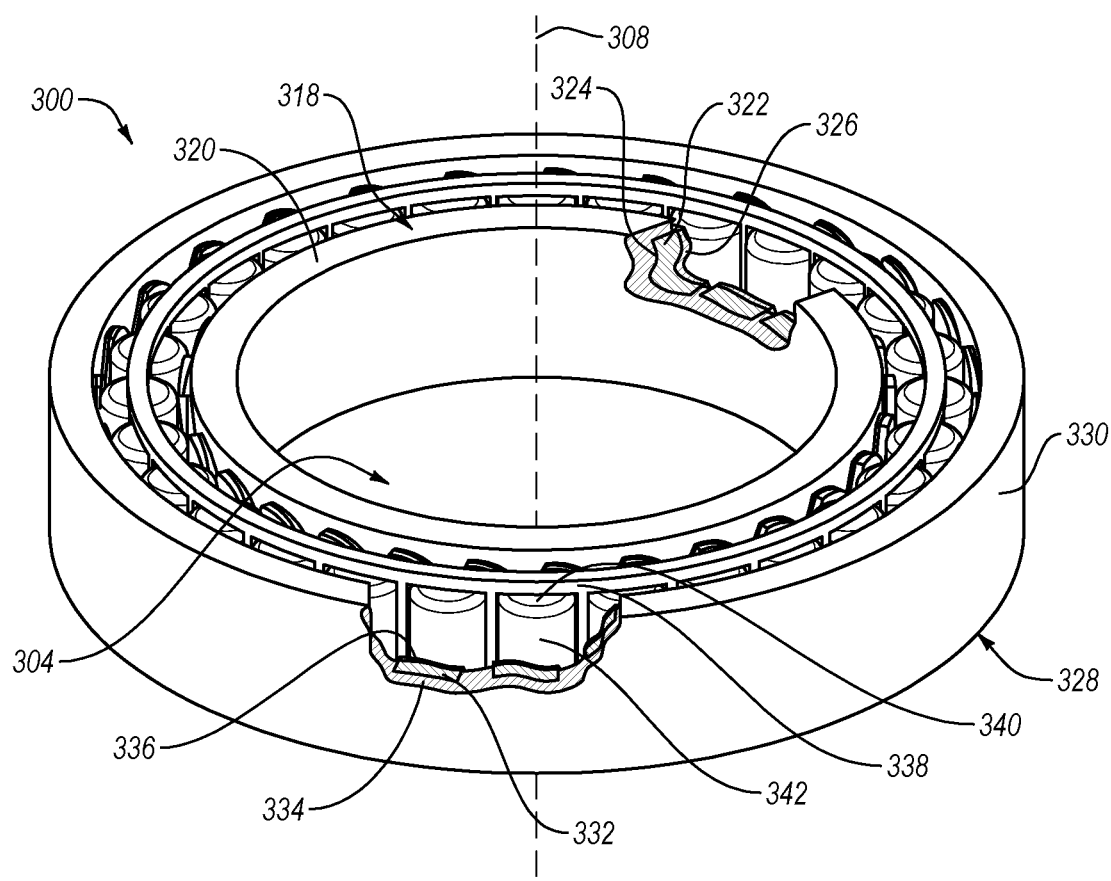
FIG. 3A is an isometric cutaway view of a radial roller bearing apparatus according to an embodiment.
Figure 3B:
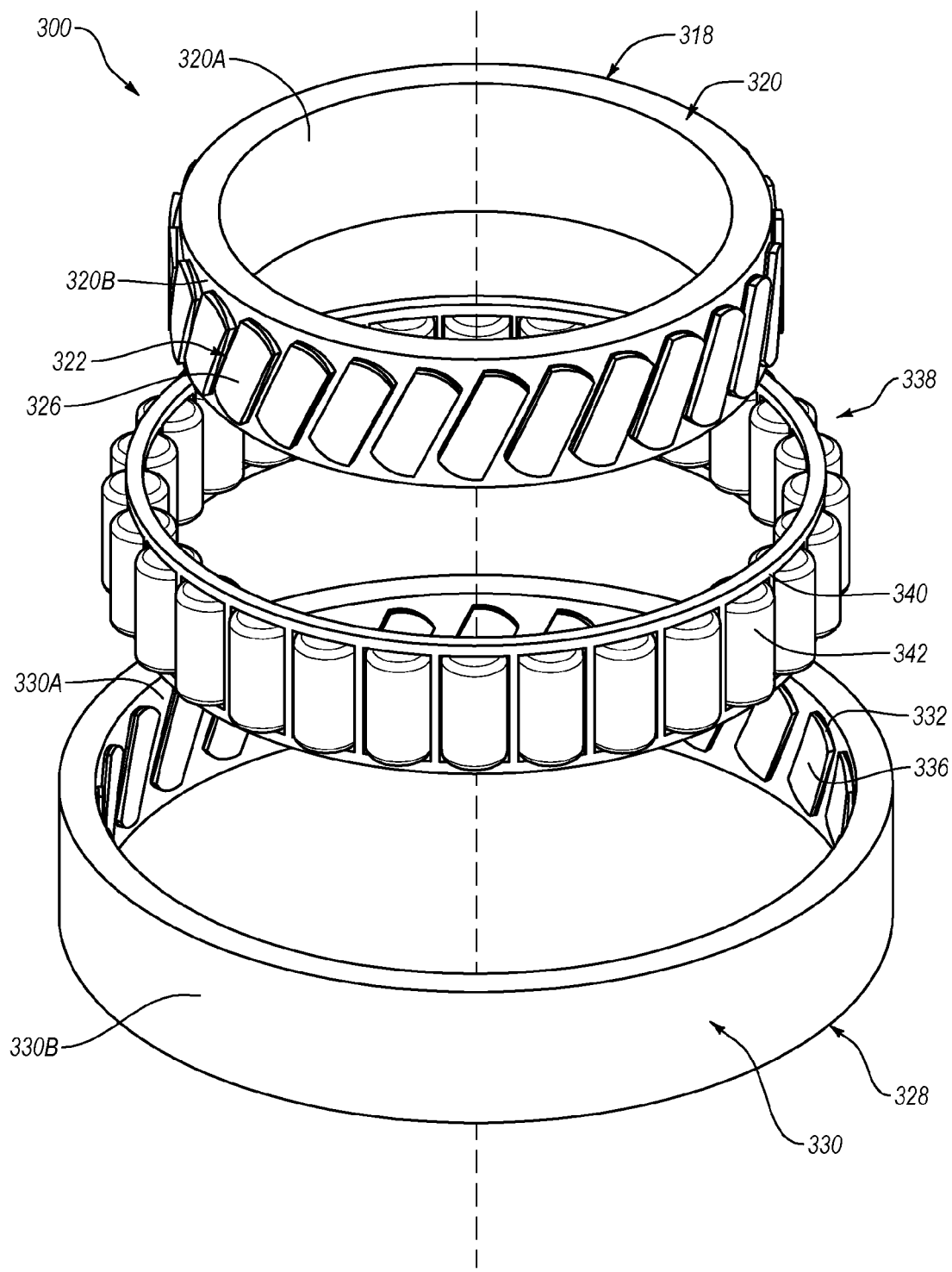
FIG. 3B is an exploded view of the radial roller bearing apparatus shown in FIG. 3A.

Any of the above-described radial roller bearing assembly embodiments may be employed in a radial roller bearing apparatus. FIG. 3A is an isometric view of a radial bearing apparatus 300 and FIG. 3B is an exploded isometric view of the radial bearing apparatus 300. As shown in FIGS. 3A and 3B, the radial roller bearing apparatus 300 may include an inner race 318 (e.g., stator), an outer race 328 (e.g., rotor), and a cage 338. The cage 338 may be interposed between the inner race 318 and the outer race 328 and include a plurality of cage pockets 340 formed in the cage 338 and distributed circumferentially about a rotation axis 308. In the illustrated embodiment, each of the cage pockets 340 is configured to retain one of a plurality of superhard rolling elements 342. However, in other embodiments, non-superhard rolling elements may be employed, such as steel rolling elements. Each of the cage pockets 340 may include a substantially rectangular cross-sectional shape. In other embodiments, one or more of the cage pockets 340 may be include a substantially oval cross-sectional shape, a substantially circular cross-sectional shape, a substantially square cross-sectional shape a substantially trapezoidal cross-sectional shape, or any other suitable cross-sectional shape. The cage pockets 340 may be arranged in a single row about the rotation axis 308. In other embodiments, the cage pockets 340 may be arranged in two rows, three rows, four rows, or any other number of rows. The cage 338 may be made from any suitable material. For example, the cage 338 may comprise a metal, alloy steel, a metal alloy, carbon steel, stainless steel, brass, tungsten carbide, or another suitable material.

In an embodiment, the superhard rolling elements 342 may be rotatably mounted within the cage pockets 340, with each of the superhard rolling element 342 having a longitudinal rotation axis substantially parallel to the rotation axis 308.

Figure 3C:
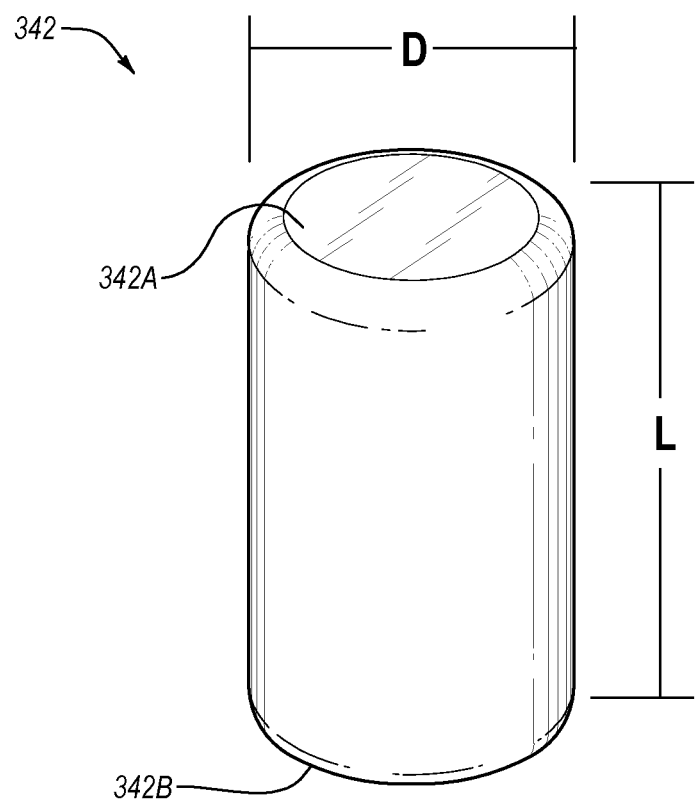
FIG. 3C is an isometric view of one of the superhard rolling elements removed from the radial roller bearing apparatus shown in FIG. 3A.

In an embodiment, the superhard rolling elements 342 may be generally cylindrical as shown in FIG. 3C. One or more of the superhard rolling elements 342 may include an upper surface 342A and a lower surface 342B defining a length L extending therebetween and a diameter D. The upper surface 342A and/or the lower surface 342B may be generally planar, generally curved, generally conical, combinations thereof, or may have any other suitable configuration. Variations in the length L and/or the diameter D of the one or more superhard rolling elements 342 may help the superhard rolling elements 342 resist deformation, fatigue and/or ultimate failure and/or influence the rotational speed of the superhard rolling elements 342. In addition, the relationship between the length L of one or more of the superhard rolling elements 342 and the diameter D of the one or more superhard rolling elements 342 may be configured to help resist deformation, fatigue and/or ultimate failure. For example, the diameter D of at least one of the superhard rolling elements 342 may be at least: about ten percent (10%); about twenty percent (20%); about thirty percent (30%); about forty percent (40%); about fifty percent (50%); about sixty percent (60%); about seventy percent (70%); about eighty percent (80%); about ninety percent (90%); about one hundred percent (100%); or about one hundred and ten percent (110%) of the length L of at least one of the superhard rolling elements 342. In addition, the diameter D of at least one of the superhard rolling elements 342 may be about ten percent (10%) to about two hundred percent (200%); or about one hundred percent (100%) of the length L of at least one of the superhard rolling elements 342. In other configurations, the diameter D of one or more of the superhard rolling elements 342 and the length L of one or more of the superhard bearing elements 342 may be larger or smaller relative to each other.

In other embodiments, the superhard rolling elements 342 may be generally spherical, ball-like, generally conical, generally hourglass-like, or any other suitable geometric shape. The superhard rolling elements 342 may be formed from any of the materials discussed above for the superhard bearing elements 106 and/or 206. For example, the superhard rolling elements 342 may be made from one or more superhard materials, such as polycrystalline diamond, polycrystalline cubic boron nitride, silicon carbide, tungsten carbide, or any combination of the foregoing superhard materials. Such a configuration of the superhard rolling elements 342 may enhance the general load capacity of the radial roller bearing apparatus 300. In addition, the configuration of the superhard rolling elements 342 may increase the relative ability of the superhard rolling elements 342 to resist deformation, fatigue and/or ultimate failure. Also, the high thermal conductivity of the superhard rolling elements 342 may transfer the heat away from the contact surface in order to prevent over heating of the radial roller bearing apparatus 300.

The inner race 318 may be configured as described herein above in relation to the radial roller bearing assembly 100 shown in FIGS. 1A-1D or any other roller bearing assembly disclosed herein. The inner race 318 may define an opening 304 may include a support ring 320 and a plurality of superhard bearing elements 322 distributed circumferentially about the rotation axis 308 in corresponding recesses 324 formed in an outer surface 320B of the support ring 320. In an embodiment, the support ring 320 may include an inner surface 320A substantially parallel to the outer surface 320B.

The recesses 324 may be arranged in a single row. In other embodiments, the recesses 324 may be circumferentially distributed in two rows, three rows, or any number of rows. Each of the superhard bearing elements 322 may include a convexly-curved bearing surface 326. The superhard bearing elements 322 may be made from any of the materials discussed above for the superhard bearing elements 106 and/or 206 and configured and positioned to provide a superhard raceway for the superhard rolling elements 342 to roll or run on.

The outer race 328 may be configured as described herein above in relation to the radial roller bearing assembly 100 shown in FIGS. 1A-1D or any other roller bearing assembly described herein. While the inner race 318 and the outer race 328 illustrated having similar configurations, the inner race 318 and the outer race 328 may have different configurations. In an embodiment, the outer race 328 (e.g., a rotor or stator) may extend about and receive the inner race 318 and the cage 338. The outer race 328 may include a support ring 330 and a plurality of superhard bearing elements 332 mounted or otherwise attached to the support ring 330 within recesses 334 formed in an inner surface 330A of the support ring 330. In an embodiment, the support ring 330 may include an outer surface 330B substantially parallel to the inner surface 330A. The recesses 334 may be configured to generally correspond to the recesses 324 formed in the support ring 320 of the inner race 318. The bearing elements 332 may have any selected geometric shape. In some embodiments, the bearing elements 332 may have a generally rounded rectangular shape, a cylindrical shape, or any other suitable geometric shape. Each of the circumferentially-distributed superhard bearing elements 332 may include a concavely-curved bearing surface 336. The superhard bearing elements 332 may be made from any of the materials discussed above for the superhard bearing elements 106 and configured and positioned to form at least a portion of the raceway for the superhard rolling elements 342 to roll or run on.

Figure 3D:
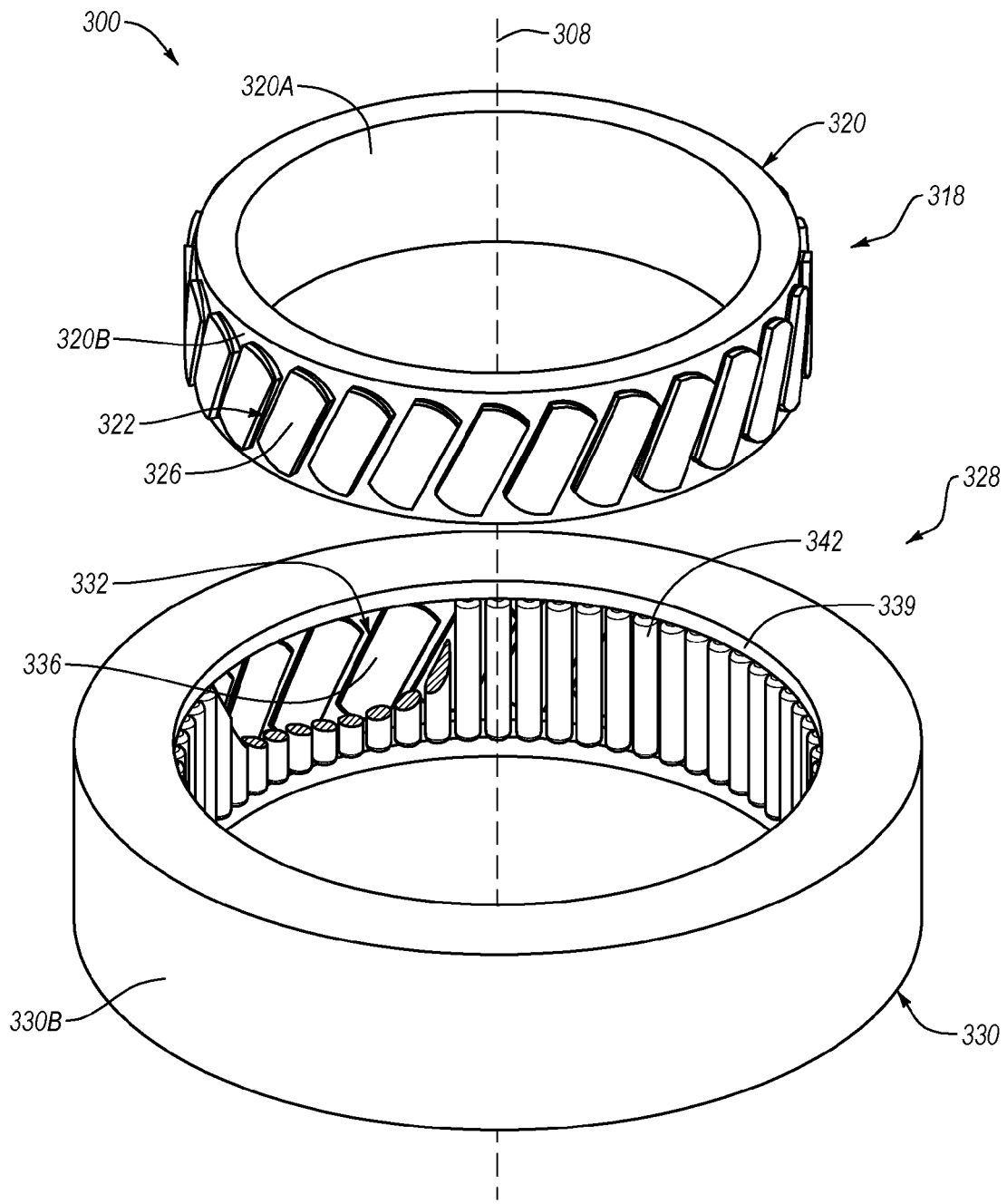
FIG. 3D is an exploded view of a radial roller bearing according to another embodiment.

In an embodiment, the cage 338 may be omitted as shown in FIG. 3D. For example, the plurality of superhard rolling elements 342 may be circumferentially distributed about the rotation axis 308 and interposed between the inner race 318 and the outer race 328 without a cage. In an embodiment, the inner race 318 and/or the outer race 328 may include flange features 339 configured to help maintain the superhard rolling elements 342 between the inner race 318 and the outer race 328. Each of the superhard rolling elements 342 may push against other superhard rolling elements 342 to hold the superhard rolling elements 342 in place.

Figure 3E:
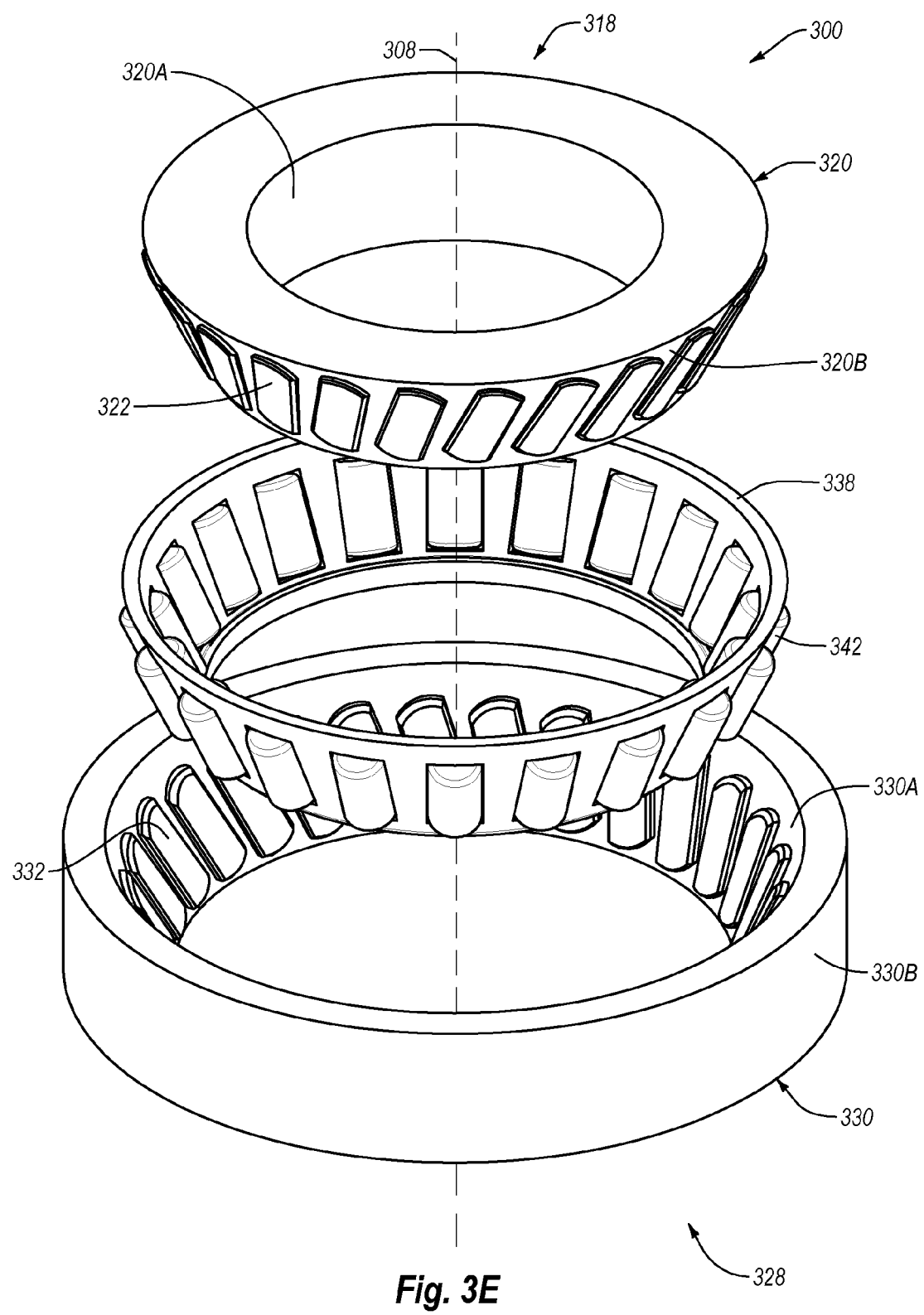
FIG. 3E is an exploded view of a tapered roller bearing apparatus according to another embodiment.

In an embodiment, the radial roller bearing apparatus 300 shown in FIG. 3D may be re-configured as a tapered roller bearing apparatus as shown in FIG. 3E. Such a configuration may allow the tapered roller bearing apparatus 300 shown in FIG. 3E to support both thrust and radial loads. The inner race 318 and the outer race 328 may each include at least one surface curved to lie substantially on an imaginary conical surface. The inner surface 320A of the support ring 320 may be substantially non-parallel to the outer surface 320B (into which the superhard bearing elements 322 are positioned) of the support ring 320 and substantially parallel to the outer surface 330B of the support ring 330. The outer surface 320B may be curved to lie substantially on an imaginary conical surface. Further, the inner surface 330A (into which the superhard bearing elements 332 are positioned) of the support ring 330 may be substantially non-parallel to the outer surface 330B of the support ring 330 and substantially parallel to the curved outer surface 320B of the support ring 320. The cage 338 including the superhard rolling elements 342 may form at least a portion of cone and may be configured to be interposed between the inner surface 320A of the support ring 320 and the outer surface 330B of the support ring 330. In an embodiment, the support ring 320 and/or support ring 330 may include respective flange features (not shown) configured to help maintain the superhard rolling elements 342 between the inner race 318 and the outer race 328. In other embodiments, the flange features may be omitted from both the support ring 320 and the support ring 330.

Referring again to FIGS. 3A and 3B, rotation of the outer race 328 and/or the inner race 318 may cause the superhard rolling elements 342 to roll or run on the superhard raceway formed between the bearing surfaces 326 of the superhard bearing elements 322 and the bearing surfaces 336 of the superhard bearing elements 332. Such a configuration may reduce failure (e.g., flaking, strain, pitting, or combinations thereof) of the rolling elements and/or the support rings. In addition, the general load capacity of the radial roller bearing apparatus 300 may be increased by the superhard rolling elements 342, the superhard bearing elements 322, and/or the superhard bearing elements 332. Further, the superhard rolling elements 342 may reduce friction as compared to bearings with bearing surfaces that contact and slide against one another.

One will appreciate that the radial roller bearing apparatus 300 may be employed in a variety of mechanical applications. For example, drill bits, pumps, turbines or transmissions may benefit from a radial roller bearing apparatus disclosed herein.

Figure 4:
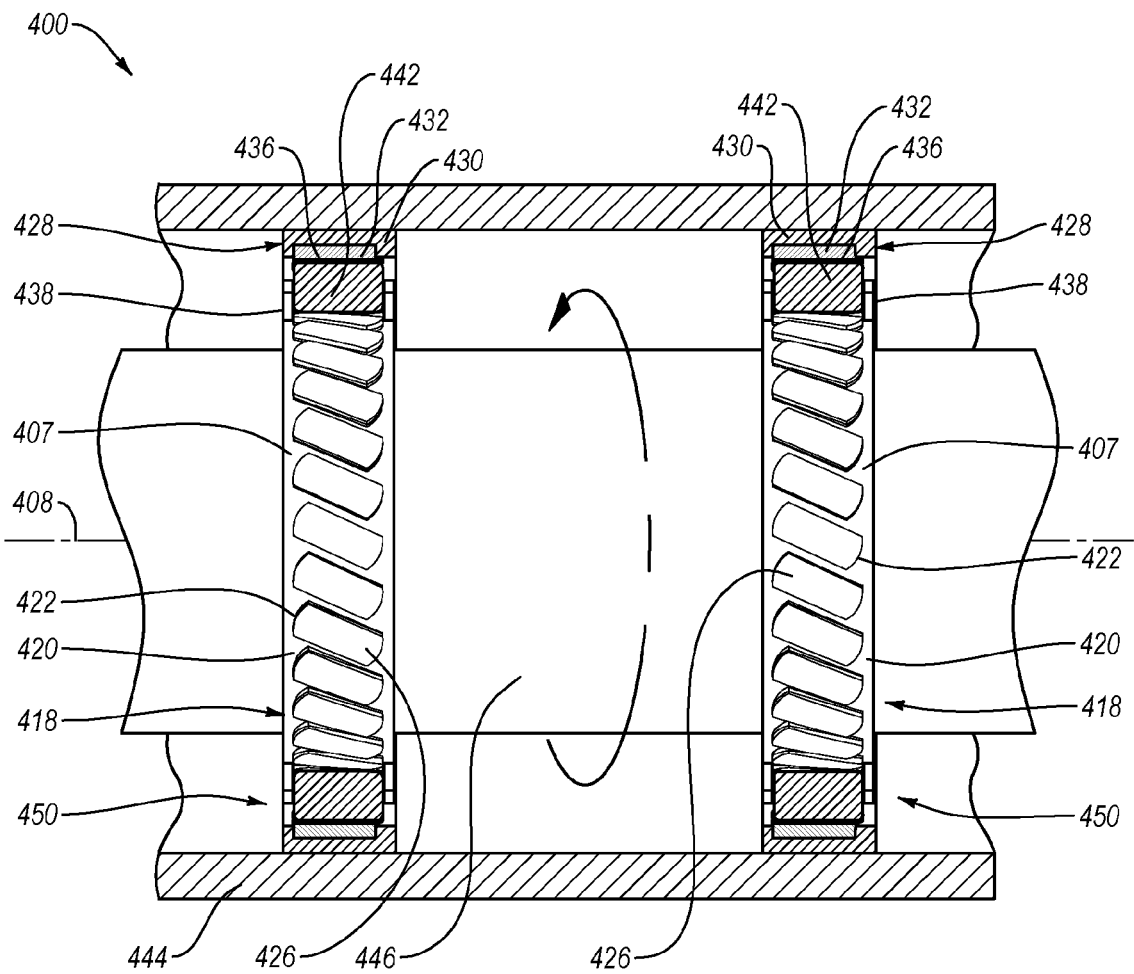
FIG. 4 is a partial isometric cutaway view of a rotary system according to an embodiment.

FIG. 4 is a partial isometric cutaway view of a rotary system 400 according to an embodiment. The rotary system 400 may include a housing 444 and a shaft or spindle 446 operably connected to a rotary motor (not shown). A pair of radial roller bearing apparatuses 450 may be operably connected to a shaft or spindle 446. Each of the radial roller bearing apparatuses 450 may include an inner race 418 (i.e., rotor), an outer race 428 (i.e., stator), and a cage 438. The shaft or spindle 446 may extend through the inner races 418 and may be secured to each inner race 418 by press fitting the shaft or spindle 446 to the inner race 418, threadly coupling the shaft or spindle 446 to the inner race 418, or another suitable technique.

In an embodiment, a cage 438 may be interposed between the inner race 418 and the outer race 428. The cage 438 may include a plurality of cage pockets (not shown) formed in the cage 438 for retaining a plurality of superhard rolling elements 442. At least one of the cage pockets may have a generally rectangular cross-sectional shape. In other embodiments, at least one of the cage pockets may have a generally oval cross-sectional shape, circular cross-sectional shape, or any other suitable cross-sectional shape. The cage 438 may be made from a variety of different materials. For example, the cage 438 may comprise carbon steel, stainless steel, tungsten carbide, or another suitable material. In other embodiments, the cage 438 may be omitted.

In an embodiment, the superhard rolling elements 442 may be rotatably mounted within the cage pockets. In an embodiment, at least one of the superhard rolling elements 442 may have a generally cylindrical geometric shape. In other embodiments, at least one of the superhard rolling elements 442 may have a generally spherical geometric shape, a generally conical geometric shape, or any other suitable geometric shape. The superhard rolling elements 442 may be made from any of the materials discussed above for the superhard rolling elements 342.

In an embodiment, the inner race 418 may include a support ring 420 and a plurality of superhard bearing elements 422 mounted or otherwise attached to the support ring 420. Each of the superhard bearing elements 422 may include a convexly-curved bearing surface 426. The superhard bearing elements 422 may be made from any of the materials discussed above for the superhard bearing elements 106.

As illustrated, the superhard bearing elements 422 may be configured and located to provide a raceway for the superhard rolling elements 442 to roll over or run on. In an embodiment, the superhard bearing elements 422 may be located on the support ring 420 such that a gap 407 is formed between adjacent ones of the superhard bearing elements 422. In other embodiments, the superhard bearing elements 422 may be located on the support ring 420 such that the superhard bearing elements 422 are immediately adjacent one another to form a substantially contiguous string of the superhard bearing elements 422. While the inner race 418 is shown having one row of the superhard bearing elements 422, the inner race 418 may include two rows, three rows, or any number of rows of the superhard bearing elements 422.

In an embodiment, the outer race 428 may extend about and receive the inner race 418 and the cage 438. The outer races 428 may include a support ring 430 and a plurality of superhard bearing elements 432 mounted or otherwise attached to the support ring 430. Each of the superhard bearing elements 432 may include a concavely-curved bearing surface 436. At least one of the superhard bearing elements 432 may have a generally elongated shape. In other embodiments, the superhard bearing elements 432 may have a geometric shape that is generally oval, generally wedge shaped, or any other suitable shape.

Like the superhard bearing elements 422, the superhard bearing elements 432 may be configured and located to at least partially define the raceway for the superhard rolling elements 442 to roll over or run on. While the outer race 428 is shown including one row of the superhard bearing elements 432, the outer race 428 may include two rows, three rows, or any number of rows of the superhard bearing elements 432.

The terms "rotor" and "stator" refer to rotating and stationary components of the radial roller bearing apparatuses 450. Thus, if the outer race 428 is configured to remain stationary, the outer race 428 may be referred to as the stator and the inner race 418 may be referred to as the rotor (or vice versa). Moreover, while the inner race 418 and the outer race 428 are illustrated as being similarly configured, the inner race 418 and the outer race 428 may have different configurations. For example, the inner race 418 may be configured similar to the radial roller bearing assembly 200 having generally moon-shaped superhard bearing elements and the outer race 428 may be configured similar to the radial roller bearing assembly 100 having generally elongated superhard bearing elements.

In an embodiment, a rotary motor (not shown) may rotate the shaft or spindle 446 about a rotation axis 408. The shaft or spindle 446 may rotate the inner race 418 about the rotation axis 408, which, in turn, may cause the superhard rolling elements 442 to roll over or run on the superhard bearing elements 422 and the superhard bearing elements 432.

Figure 5A:
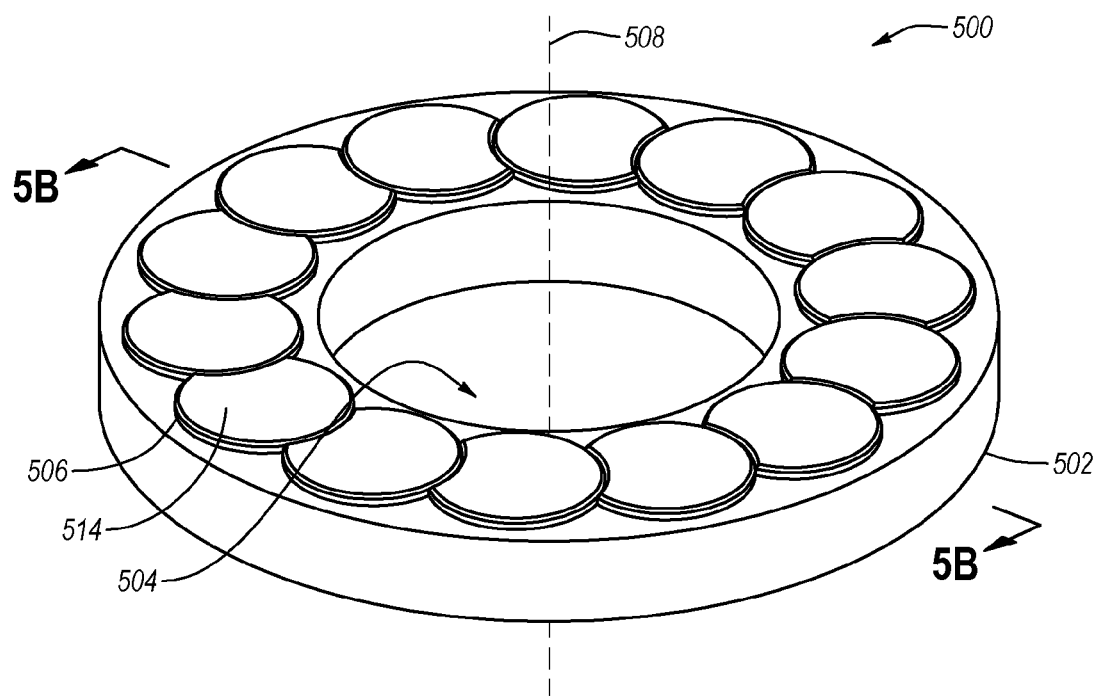
FIG. 5A is an isometric view of a thrust roller bearing assembly according to an embodiment.
Figure 5B:
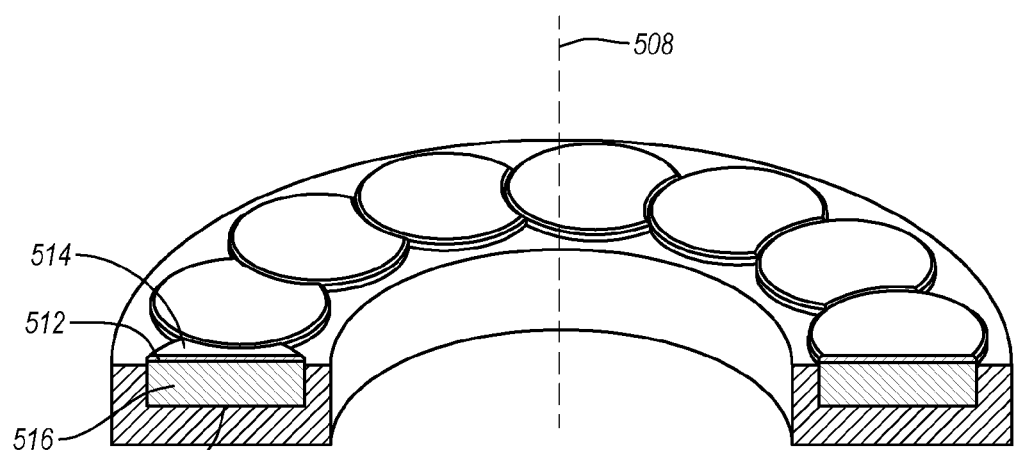
FIG. 5B is a cross-sectional view of the thrust roller bearing assembly shown in FIG. 5A taken along line 5B-5B.

The concepts used in the radial roller bearing assemblies and apparatuses described above may also be employed in a variety of thrust-bearing assemblies and apparatuses. For example, FIG. 5A is an isometric view of a thrust-roller bearing assembly 500 according to an embodiment. The thrust-roller bearing assembly 500 may form a stator or a rotor of a thrust-roller bearing apparatus used in a variety of mechanical applications.

The thrust-roller bearing assembly 500 may include a support ring 502 defining an opening 504 through which a shaft (not shown) of, for example, a downhole drilling motor may extend. The support ring 502 may be made from a variety of different materials such as carbon steel, stainless steel, tungsten carbide, combinations thereof, or another suitable material. The thrust-roller bearing assembly 500 may further include a plurality of superhard bearing elements 506 and a plurality of recesses 510 formed in the support ring 502. Each of the superhard bearing elements 506 may be partially disposed in a corresponding one of the recesses of the support ring 502 via brazing, press-fitting, or another suitable technique or a common slot for all of the superhard bearing elements 506 formed in the support ring 502.

The superhard bearing elements 506 are illustrated being distributed circumferentially about a thrust axis 508 along which a thrust force may be generally directed during use. In the illustrated embodiment, each of the superhard bearing elements 506 may comprise a superhard bearing table 512 including a bearing surface 514, with the superhard bearing table 512 bonded to a substrate 516. However, in other embodiments, all or some of the superhard bearing elements 506 may be different or even substrateless. In an embodiment, the bearing surfaces 514 may be substantially coplanar to one another. The superhard bearing elements 506 may each be made from any of the materials discussed above for the superhard bearing elements 106 or 206. For example, the superhard bearing elements 506 may be made from polycrystalline diamond or any other suitable superhard materials. As shown, the superhard bearing elements 506 may have a geometric shape that is generally formed by the intersection of two circles (e.g., lune, lens, or crescent-shaped). In other embodiments, the superhard bearing elements 506 may have a geometric shape that is generally oval, generally wedge-like, or any other suitable geometric shape.

As shown, the superhard bearing elements 506 may be circumferentially distributed about the thrust axis 508 such that the superhard bearing elements 506 abut one another. In other embodiments, the superhard bearing elements 506 may be circumferentially distributed about the thrust axis 508 such that gaps between adjacent ones of the superhard bearing elements 506 are occupied by a portion of the support ring 502. Such a configuration may increase the surface area of the support ring 502 in contact with the superhard bearing elements 506 to help affix the superhard bearing elements 506 to the support ring 502.

In an embodiment, the superhard bearing elements 506 may be configured and located on the support ring 502 to at least partially define a superhard raceway for rolling elements to roll over or run on. By forming a superhard raceway with the superhard bearing elements 506, deformation of the support ring 502 and/or the risk of fatigue may be reduced because the rolling elements generally do not contact the support ring 502. In addition, the configuration of the superhard bearing elements 506 may enhance the general load capacity of the thrust-roller bearing assembly 500 and/or reduce friction in comparison to bearings with bearing surfaces that contact and slide against one another.

Figure 6A:
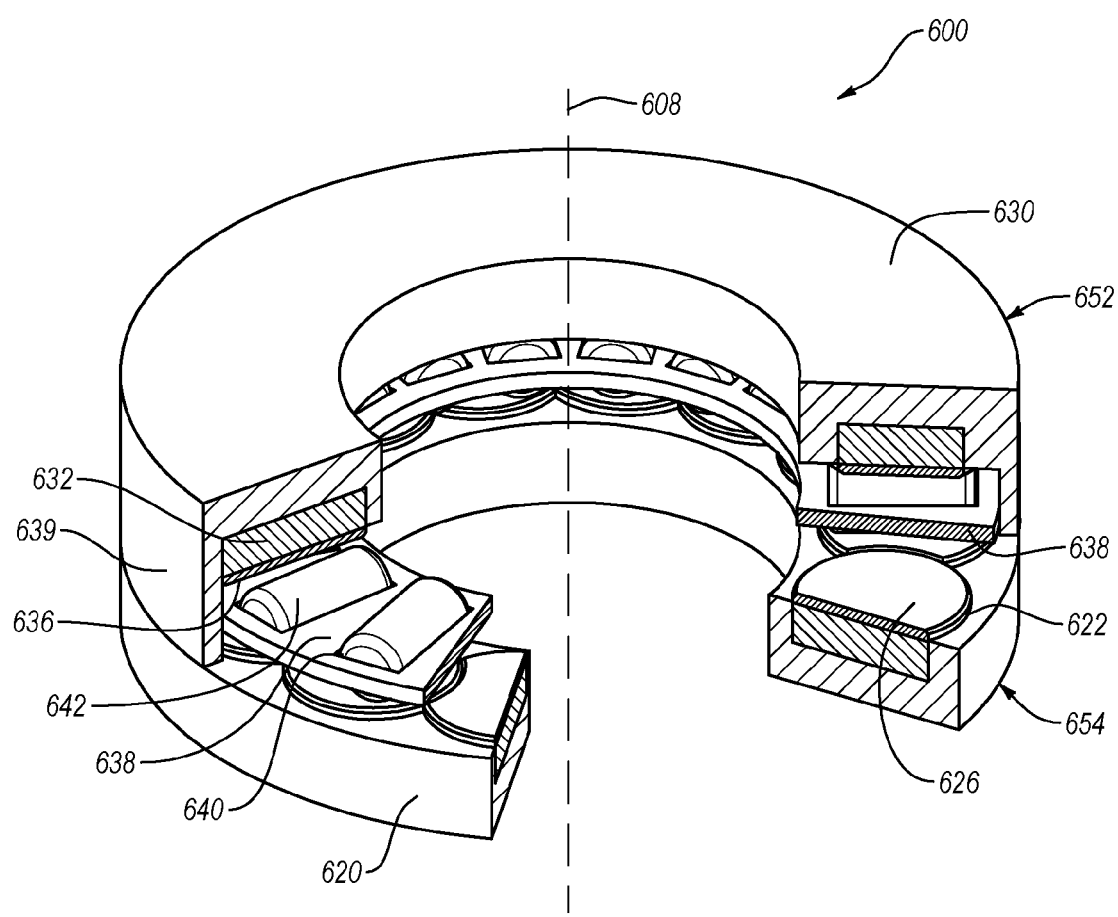
FIG. 6A is an isometric cutaway view of a thrust roller bearing apparatus according to an embodiment.

Any of the above-described thrust roller bearing assembly embodiments may be employed in a thrust-roller bearing apparatus. FIG. 6A is an isometric view of a thrust-roller bearing apparatus 600. The thrust-roller bearing apparatus 600 may include a stator 652, a cage 638, and a rotor 654.

The cage 638 may be interposed between the stator 652 and the rotor 654. The cage 638 may include a plurality of cage pockets 640 formed in the cage 638 for retaining a plurality of superhard rolling elements 642. Each of the cage pockets 640 may have a substantially rectangular geometric shape and may be distributed circumferentially about a thrust axis 608. In other embodiments, the cage pockets 640 may have a generally oval, circular, or any other suitable geometric shape. The cage pockets 640 may be arranged in a single row about the thrust axis 608. In other embodiments, the cage pockets 640 may be arranged in two rows, three rows, or any number of suitable rows. The cage 638 may be made from a variety of different materials including carbon steel, stainless steel, tungsten carbide, and the like.

The superhard rolling elements 642 may be rotatably mounted within the cage pockets 640 and may be positioned substantially perpendicular to the thrust axis 608. As illustrated the superhard rolling elements 642 may be generally cylindrical. In other embodiments, the superhard rolling elements 642 may be generally spherical or other suitable geometric shapes. One or more of the superhard rolling elements 642 may be formed from any of the materials discussed above for the superhard rolling elements 342. For example, the superhard rolling elements 642 may be made from one or more superhard materials, such as polycrystalline diamond, polycrystalline cubic boron nitride, silicon carbide, tungsten carbide, or any combination of the foregoing superhard materials.

The stator 652 may be configured as described herein above in relation to the thrust-roller bearing assembly 400 shown in FIGS. 4A and 4B or any other thrust-roller bearing assembly embodiment disclosed herein. The stator 652 may include a plurality of circumferentially-adjacent superhard bearing elements 632 configured and located to at least partially define a raceway for the superhard rolling elements 642 to roll on or run over. The superhard bearing elements 632 may each include a bearing surface 636. The superhard bearing elements 632 may exhibit, for example, the configuration of the superhard bearing elements 206. In an embodiment, the superhard bearing elements 632 may be mounted or otherwise attached to a support ring 630.

The rotor 654 may include a support ring 620 and a plurality of superhard bearing elements 622 mounted or otherwise attached to the support ring 620, with each of the superhard bearing elements 622 having a bearing surface 626. Like the superhard bearing elements 632, the superhard bearing elements 622 may be configured and positioned on the support ring 620 to at least partially define a raceway for the superhard rolling elements 642 to run over or roll on during use of the thrust roller bearing apparatus 600. The superhard bearing elements 622 may exhibit, for example, the configuration of the superhard bearing elements 206. In an embodiment, the support ring 630 and/or the support ring 620 may include a flange 639 configured to help maintain the superhard rolling elements 642 between the stator 652 and the rotor 654. In other embodiments, the flange may be omitted.

It is noted that in other embodiments, the rotor or stator may be configured as any of the previously described embodiments of thrust roller bearing assemblies. Moreover, the disclosed thrust roller bearing apparatuses may be used in a number of applications, such as subterranean drilling systems, directional drilling systems, pumps, transmissions, gear boxes, and many other applications.

Figure 6B:
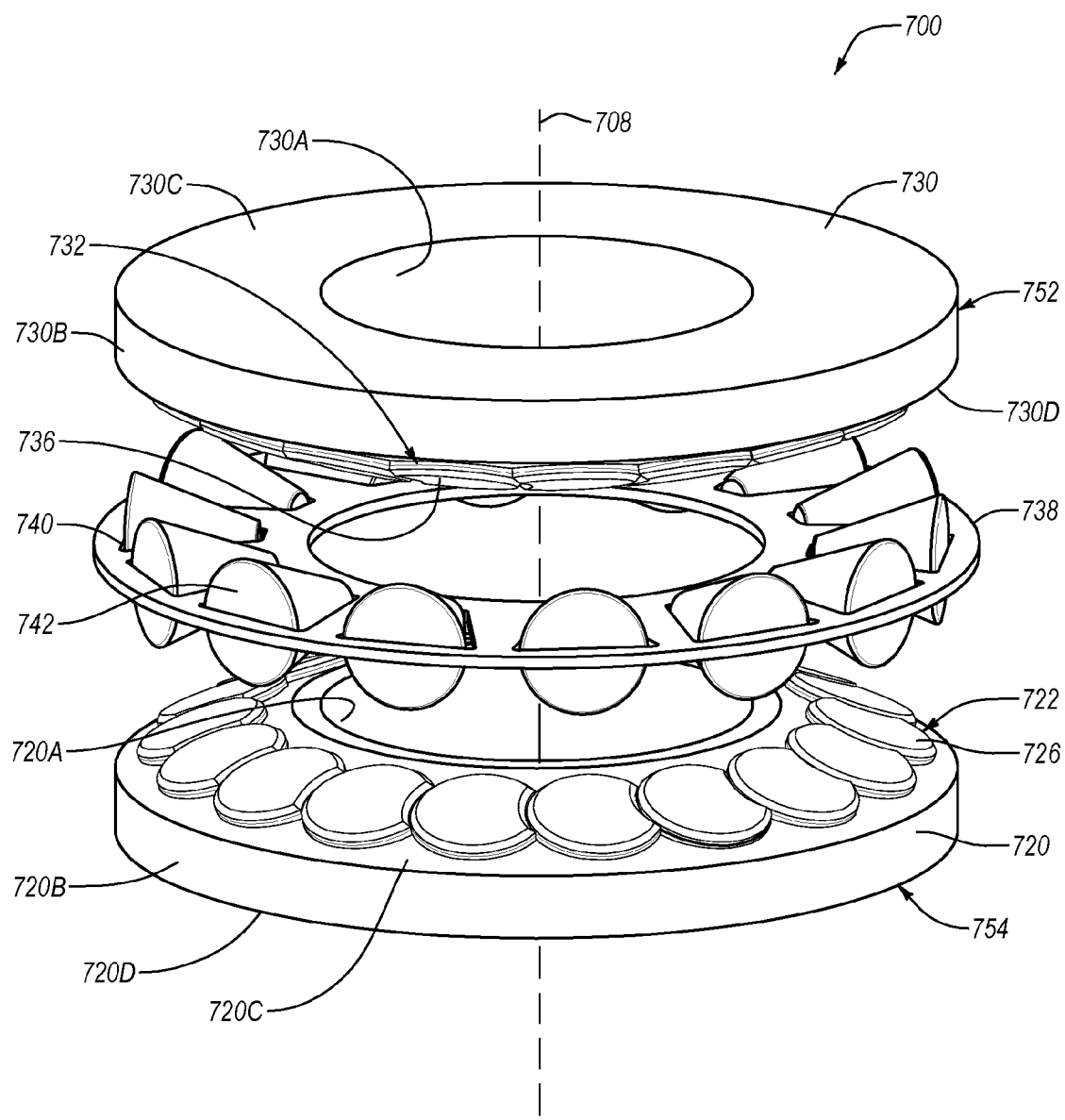
FIG. 6B is an exploded isometric view of a tapered bearing apparatus according to another embodiment.

FIG. 6B is an exploded view of a tapered bearing apparatus 700 according to another embodiment. The tapered bearing apparatus 700 may include a stator 752, a cage 738, and a rotor 754.

The cage 738 may be interposed between the stator 752 and the rotor 754. The cage 738 may include a plurality of cage pockets 740 formed in the cage 738 configured to retain a plurality of superhard rolling elements 742. Each of the cage pockets 740 may have a substantially trapezoidal shape and may be distributed circumferentially about a thrust axis 708. The cage pockets 740 may be arranged in a single row, two rows, three rows, or any other number of suitable rows about the thrust axis 708. The cage 738 may be made from one or more selected materials, such as carbon steel, stainless steel, tungsten, copper, carbide material, combinations thereof, or any other suitable material. The superhard rolling elements 742 may be rotatably mounted within the cage pockets 740, with their respective rotation axes positioned substantially perpendicular to the thrust axis 708. The superhard rolling elements 742 may be generally conical having generally planar end portions. In other embodiments, one or more of the superhard rolling elements 742 may have at least one generally curved end portion, generally concave end portion, generally convex end portion, generally pointed end portion, combinations thereof, or other suitable end portion configuration. One or more of the superhard rolling elements 742 may be formed from any of the materials discussed above for the superhard rolling elements 342. For example, the superhard rolling elements 742 may be made from one or more superhard materials, such as polycrystalline diamond, polycrystalline cubic boron nitride, silicon carbide, tungsten carbide, or any combination of the foregoing superhard materials.

The stator may include a plurality of circumferentially-adjacent superhard bearing elements 732 configured and located to at least partially define a raceway for the superhard rolling elements to roll on or run over. The superhard bearing elements 732 may each include a bearing surface 736 configured to substantially lie on an imaginary conical surface. The superhard bearing elements 732 may exhibit, for example, the general configuration of the superhard bearing elements 206. In other embodiments, the superhard bearing elements 732 may be generally trapezoidal, generally wedge-like shaped, generally oval, combinations thereof, or the like. In yet other embodiments, the superhard bearing elements 732 may exhibit, for example, the general configuration of the superhard bearing elements 106 or any other superhard bearing element embodiment disclosed herein. In an embodiment, the superhard bearing elements 732 may be mounted or otherwise attached to at least a lower surface 730D of the support ring 730. As shown, the support ring 730 may include an upper surface 730C, the lower surface 730D, an inner surface 730A, and an outer surface 730B. In an embodiment, the inner surface 730A and the outer surface 730B may extend between the upper surface 730C and the lower surface 730B. The inner surface 730A may be generally parallel relative to the outer surface 730B. In other embodiments, at least a portion of the inner surface 730A may be generally non-parallel relative to at least a portion of the outer surface 730B. As illustrated, the lower surface 730D may be generally non-parallel the upper surface 730C and may form at least a portion of a generally conical surface. For example, the lower surface 730D may extend and taper between the inner surface 730A and the outer surface 730B.

The rotor 754 may include a support ring 720 and a plurality of superhard bearing elements 722, with each of the superhard bearing elements 722 having a bearing surface 726 configured to substantially lie on an imaginary conical surface. Like the superhard bearing elements 732, the superhard bearing elements 722 may be configured and positioned on the support ring 720 to at least partially define a raceway for the superhard rolling elements 742 to run over or roll on during use of thrust roller bearing apparatus 700. In an embodiment, the superhard bearing elements 722 may be mounted or otherwise attached to at least an upper surface 720C of the support ring 720. As shown, the support ring 720 may include the upper surface 720C, a lower surface 720D, an inner surface 720A, and an outer surface 720B. In an embodiment, the inner surface 720A and the outer surface 720B may extend between the upper surface 720C and the lower surface 720D. The inner surface 720A may be generally parallel relative to the outer surface 720B. In other embodiments, at least a portion of the inner surface 720A may be generally non-parallel relative to at least a portion of the outer surface 720B. As illustrated, the upper surface 720C of the support ring 720 may be generally non-parallel the lower surface 720D and may form at least a portion of a generally conical surface. For example, the upper surface 720C may generally extend and taper between the inner surface 720A and the outer surface 720B. In an embodiment, the support ring 730 and/or the support ring 720 may include a flange feature configured to help maintain the superhard rolling elements 742 between the stator 752 and the rotor 754. In other embodiments, the flange feature(s) may be omitted. It is noted that in other embodiments, the rotor or stator may be configured as any of the previously described embodiments of thrust roller bearing assemblies.

Figure 7:
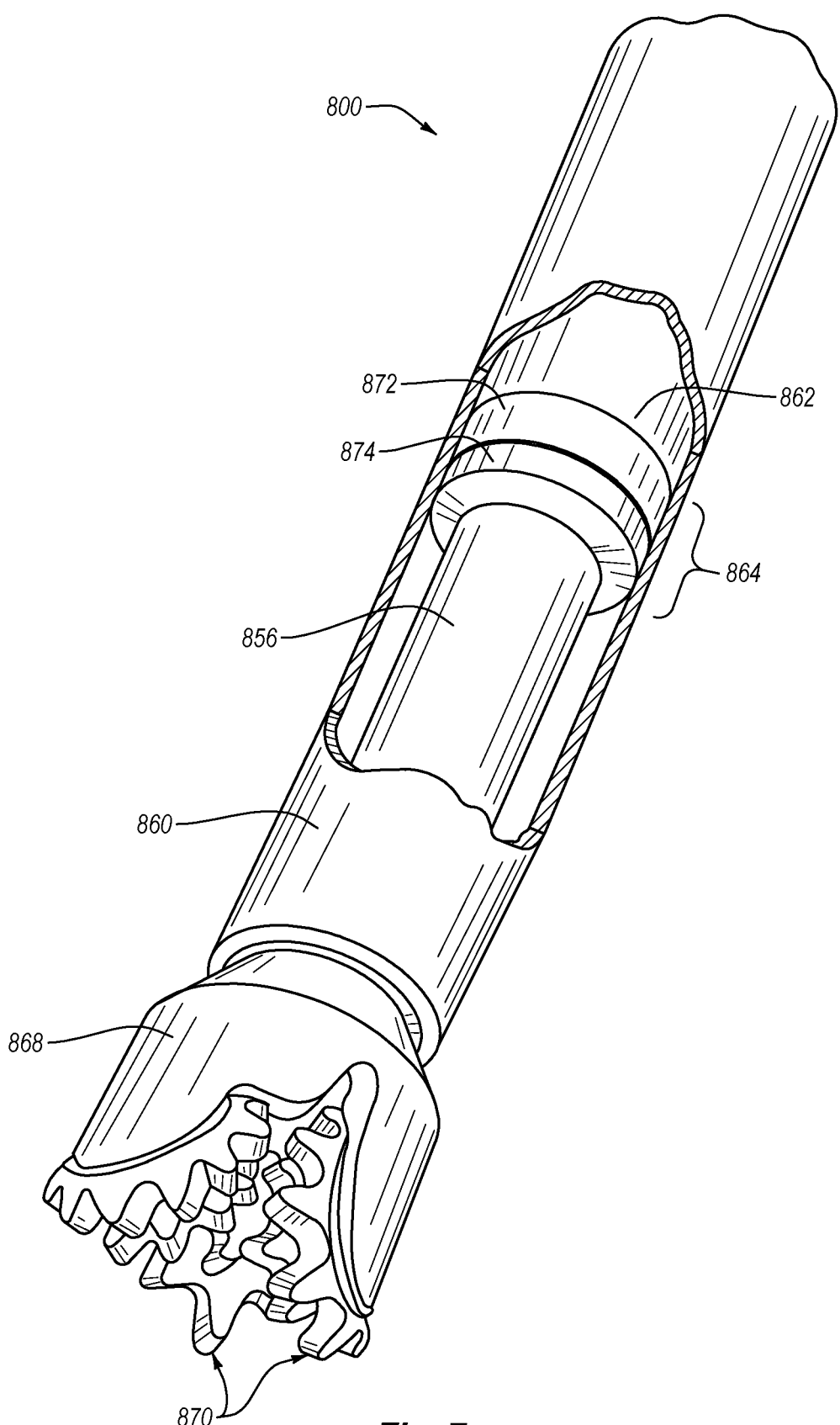
FIG. 7 is a schematic isometric cutaway view of a rotary system according to an embodiment.

Any of the embodiments for bearing apparatuses discussed above may be used in a subterranean drilling system. FIG. 7 is a schematic isometric cutaway view of a subterranean drilling system 800 according to an embodiment. The subterranean drilling system 800 may include a housing 860 enclosing a downhole drilling motor 862 (i.e., a motor, turbine, or any other device capable of rotating an output shaft) that may be operably connected to an output shaft 856. A thrust-roller bearing apparatus 864 may be operably coupled to the downhole drilling motor 862. The thrust roller-bearing apparatus 864 may be configured as any of the previously described thrust-roller bearing apparatus embodiments. A rotary drill bit 868 may be configured to engage a subterranean formation and drill a borehole and may be connected to the output shaft 856. The rotary drill bit 868 is shown as a roller cone bit including a plurality of roller cones 870. However, other embodiments may utilize different types of rotary drill bits, such as so-called "fixed cutter" drill bits. As the borehole is drilled, pipe sections may be connected to the subterranean drilling system 800 to form a drill string capable of progressively drilling the borehole to a greater depth within the earth.

The thrust-roller bearing apparatus 864 may include a stator 872 that does not rotate and a rotor 874 that may be attached to the output shaft 856 and rotates with the output shaft 856. The thrust-roller bearing apparatus 864 may further include a cage (not shown) interposed between the stator 872 and the rotor 874. The cage may include a plurality of cage pockets (not shown) for retaining a plurality of superhard rolling elements (not shown). As discussed above, the thrust-roller bearing apparatus 864 may be configured as any of the embodiments disclosed herein. For example, the stator 872 may include a plurality of circumferentially-distributed superhard bearing elements configured to at least partially define a raceway for the superhard rolling elements to roll over or run on. In addition, the rotor 874 may include a plurality of circumferentially-distributed superhard bearing elements and configured to provide a bearing surface for the superhard rolling elements to roll or run on.

Although several of the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A roller bearing assembly, comprising:
a plurality of superhard bearing elements distributed circumferentially about an axis, with gaps located between adjacent ones of the superhard bearing elements, each of the plurality of superhard bearing elements including:
a bearing surface positioned and configured to form at least a portion of a superhard raceway for rolling elements to roll over; and
at least one side surface intersecting the bearing surface, the at least one side surface forming a respective oblique angle relative to the axis, wherein the respective oblique angle is selected to at least partially inhibit the gaps from impeding the rolling elements during operation; and
a support ring including a plurality of recesses, the plurality of recesses being distributed circumferentially about the axis, wherein a corresponding one of the plurality of superhard bearing elements is affixed to the support ring within a corresponding one of the plurality of recesses.

2. The roller bearing assembly of claim 1, wherein the respective oblique angle is greater than about forty (40) degrees.

3. The roller bearing assembly of claim 1, wherein the respective oblique angle is about forty (40) degrees to eighty (80) degrees.

4. The roller bearing assembly of claim 1, wherein one or more of the plurality of superhard bearing elements has a generally rectangular shape with convex end portions.

5. The roller bearing assembly of claim 1, wherein one or more of the superhard bearing elements include a concavely-curved bearing surface or a convexly-curved bearing surface.

6. The roller bearing assembly of claim 1, wherein one or more of the plurality of superhard bearing elements comprises a substrate and a polycrystalline diamond table bonded to a substrate.

7. The roller bearing assembly of claim 1, wherein the raceway is substantially planar, substantially cylindrical, or substantially conical.

8. The roller bearing assembly of claim 1, wherein the support ring and the plurality of superhard bearing elements define a radial roller bearing assembly, a thrust roller bearing assembly, or a tapered roller bearing assembly.

9. The roller bearing assembly of claim 1, wherein one or more of the gaps comprise a width of about 0.00020 inches to 0.100 inches.

10. The roller bearing assembly of claim 1, wherein one or more of the gaps comprise a width of about 0.00020 inches to 0.020 inches.

11. A roller bearing apparatus, comprising:
a first roller bearing assembly including:
a first plurality of superhard bearing elements distributed circumferentially about an axis, with gaps located between adjacent ones of the first plurality of superhard bearing elements, each of the first plurality of superhard bearing elements including a bearing surface and at least one side surface intersecting the bearing surface, wherein the bearing surfaces of the first plurality of superhard bearing elements are positioned and configured to form a first portion of a superhard raceway;
a first support ring that carries the first plurality of superhard bearing elements; and
a second roller bearing assembly including:
a second plurality of superhard bearing elements generally opposed to the first plurality of superhard bearing elements of the first roller bearing assembly, wherein the second plurality of superhard bearing elements are positioned and configured to form a second portion of the superhard raceway;
a second support ring that carries the second plurality of superhard bearing elements; and
a plurality of elongated superhard rolling elements interposed between the first roller bearing assembly and the second roller bearing assembly, the plurality of superhard rolling elements positioned and configured to roll on the superhard raceway.

12. The roller bearing apparatus of claim 11, further comprising a cage interposed between the first roller bearing assembly and the second roller bearing assembly, the cage including a plurality of cage pockets distributed about the axis that retains the plurality of superhard rolling elements therein.

13. The roller bearing apparatus of claim 11, wherein the at least one side surface of each of the first plurality of superhard bearing elements forming a respective oblique angle relative to the axis, the respective oblique angles of the first plurality of superhard bearing elements are selected to at least partially inhibit the gaps from impeding rolling of the plurality of superhard rolling elements during operation.

14. The roller bearing apparatus of claim 11, wherein one or more of the first or second plurality of superhard bearing elements comprise a concavely-curved bearing surface or a convexly-curved bearing surface.

15. The roller bearing apparatus of claim 11, wherein one or more of the first or second plurality of superhard bearing elements comprise a substrate and a polycrystalline diamond table bonded to a substrate.

16. The roller bearing apparatus of claim 11, wherein the raceway is substantially planar, substantially cylindrical, or substantially conical.

17. The roller bearing apparatus of claim 11, wherein the first and second roller bearing assemblies form a radial roller bearing assembly, a thrust roller bearing assembly, or a tapered roller bearing assembly.

18. The roller bearing apparatus of claim 11, wherein one or more of the gaps comprise a width of about 0.00020 inches to 0.100 inches.

19. The roller bearing apparatus of claim 11, wherein one or more of the gaps comprise a width of about 0.00020 inches to 0.020 inches.

20. The roller bearing apparatus of claim 11, wherein the at least one side surface of each of the first plurality of superhard bearing elements forms a respective oblique angle relative to the axis.

* * * * *